United States Patent [19]

Hayashi et al.

[11] Patent Number: 4,627,280

[45] Date of Patent: Dec. 9, 1986

[54] INDUCTANCE LIQUID LEVEL METER

[75] Inventors: Chikahisa Hayashi; Makoto Kawai; Mikio Adachi, all of Aichi, Japan

[73] Assignee: Toyoda Gosei Co., Ltd., Nishikasugai, Japan

[21] Appl. No.: 739,476

[22] Filed: May 30, 1985

[30] Foreign Application Priority Data

| May 31, 1984 | [JP] | Japan | 59-112277 |
| May 31, 1984 | [JP] | Japan | 59-112278 |
| May 31, 1984 | [JP] | Japan | 59-112279 |
| May 31, 1984 | [JP] | Japan | 59-112280 |
| May 31, 1984 | [JP] | Japan | 59-81247[U] |
| May 31, 1984 | [JP] | Japan | 59-81248[U] |
| May 31, 1984 | [JP] | Japan | 59-81249[U] |

[51] Int. Cl.⁴ .................. G01F 23/76; G01R 33/00
[52] U.S. Cl. ................... 73/290 R; 324/207; 336/183
[58] Field of Search ............. 73/290 R, 313, DIG. 5, 73/308; 336/183

[56] References Cited

U.S. PATENT DOCUMENTS

| 0,986,210 | 3/1911 | Pearson | 73/DIG. 5 |
| 2,424,766 | 7/1947 | Miner | 336/30 |
| 2,484,690 | 10/1949 | DeGiers | 73/313 X |
| 2,853,878 | 9/1958 | Anderson et al. | 73/313 |
| 3,678,748 | 7/1972 | Dziedzic | 73/290 R |
| 3,678,750 | 7/1972 | DiNola et al. | .73/313 |
| 3,688,187 | 8/1972 | Loos | 336/45 |
| 4,305,285 | 12/1981 | Kubota et al. | 73/308 |

Primary Examiner—Daniel M. Yasich
Attorney, Agent, or Firm—Cushman, Darby & Cushman

[57] ABSTRACT

The present invention relates to a liquid level meter, comprising a coil having a core, a float which is provided at the external circumference of coil so that it can move in the longitudinal direction along the same core and comprises a conductor ring, a detector which detects change of inductance of coil in accordance with movement of said float namely conductor ring, a converting circuit which converts change of inductance detected by the detector into change of voltage and a liquid level indicator which is driven by a drive circuit in accordance with such conversion.

17 Claims, 22 Drawing Figures

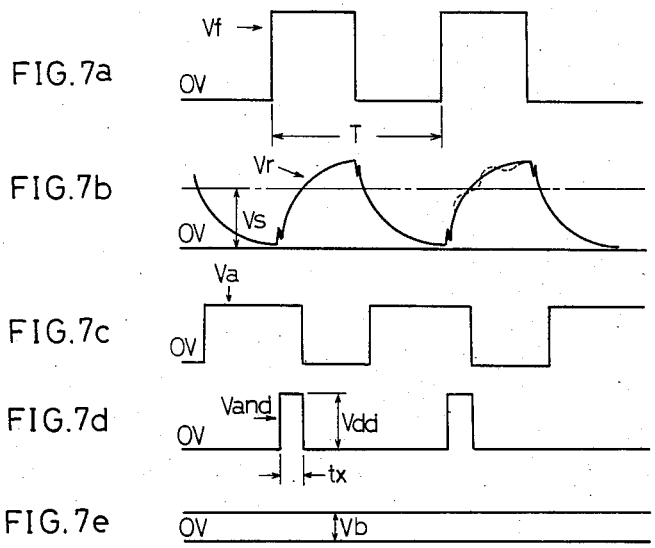
FIG. 7a
FIG. 7b
FIG. 7c
FIG. 7d
FIG. 7e
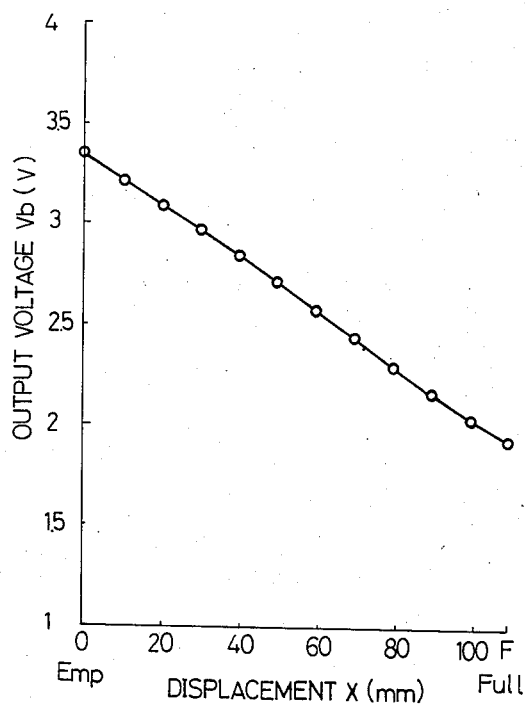
FIG. 8

FIG.14
PRIOR ART
FIG.15
PRIOR ART
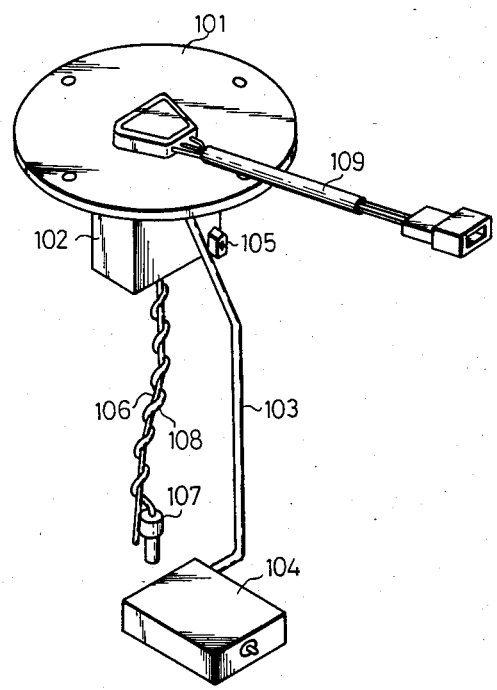
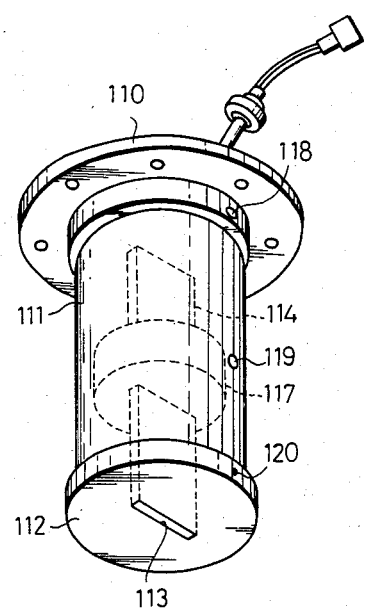
FIG.16
PRIOR ART
FIG.17
PRIOR ART
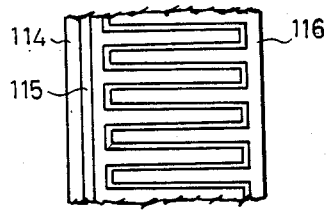
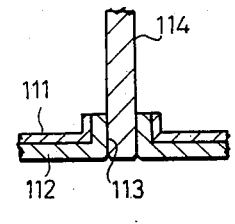

INDUCTANCE LIQUID LEVEL METER

BACKGROUND OF THE INVENTION

1. Field of the Invention

The present invention relates to a liquid level meter which detects and indicates level of various kinds of liquids such as gasoline, oil, petroleum, water and others stored in a tank or other various kinds of containers to be provided to automobiles and other machineries and apparatuses for industrial use. More specifically, the invention relates to an L-V conversion circuit which converts a change of inductance of a coil provided at the liquid level detecting part into a change of voltage.

2. Description of the Prior Art

A liquid-level meter of arm float type shown in FIG. 14 has been used. Such liquid level meter will be explained briefly. 101 is a set plate to be attached to a liquid container and a body 102 comprising a rotary potentiometer (not shown) is provided at the lower surface thereof. 103 is a float arm which is rotatably provided to the upper part of body 102 and a float 104 formed by a forming rubber is provided to the lower end of such float arm. The upper end of this float arm 103 is coupled so that it rotates said potentiometer.

105 is a float arm stopper provided to the body 102. 106 is a shaft extending downward from the lower surface of body 102, around which a cable 108 of a level switch is wound. 109 is an output cable.

Such arm float type liquid level meter has disadvantages; 1: accuracy is bad due to error in the shape of float arm 103 and loading accuracy, 2: accuracy in detection of position of float 104 generates dispersion due to friction at the bearing of float arm, 3: linearity between a rotating angle and liquid level is low because of a rotary type which is easily affected by swaying in the thrust direction to the shaft, 4: it is difficult to insert the meter into the container, and 5: the float arm 103 moves for the excessive range in the container, etc.

Moreover, the linear potentiometer type liquid level meters shown in FIG. 15 to FIG. 17 have also been used. Such liquid level meter will also be explained briefly. 110 is a set plate, 111 is a cylindrical case attached to the lower surface thereof. 112 is a bushing rubber attached to the lower end of case 111. At the center of such rubber, a hole 113 like a slit is formed and it is folded to the inside as shown in FIG. 17.

114 is a linear potentiometer provided within a case, coated with a common line 115 and a resistance pattern 116 formed like a rectangular wave as shown in FIG. 16. The lower end of the same linear potentiometer 114 is closely in contact with said hole 113. 117 is a float externally engaged with the linear potentiometer 114, short-circuitting between said common line 115 and resistance pattern 116. 118 is an air drain, and 119, 120 are liquid flowing holes.

Such linear potentiometer type liquid level meter has following disadvantages; namely, 1: accuracy is lowered by the effect of friction of float 117 to the linear potentiometer 114 on buoyancy of float 117, 2: a float 117 becomes large in size 3: a case 111 is necessary for avoiding the swaying of float 117 as much as possible, 4: dust is easily adhered because a linear potentiometer 114 is exposed and the resistance materials 115, 116 have uneven surfaces, and 5: poor contact may occur and the float may catch somewhere.

SUMMARY OF THE INVENTION

It is an object of the present invention to provide a liquid level meter which improves liquid level detection sensitivity and indicates liquid level with high accuracy.

It is another object of the present invention to provide a liquid level meter which has succeeded in use of a light-weight conductor ring, reduction in size of float, accordingly a detecting part, can be loaded easily to the liquid container and requires small space within the liquid container.

It is further object of the present invention to provide a liquid level meter which assures smooth vertical movement of float, does not generate defective operation and deterioration of accuracy and does not allow of trouble due to the swaying of float.

It is still further object of the present invention to provide a liquid level meter which dust in the liquid is not easily adhered to the detector and defective operation of the float is remarkably reduced.

It is still further object of the present invention to provide a liquid level meter which reduces deterioration of accuracy of float for rolling of liquid level.

It is still further object of the present invention to provide a liquid level meter which does not require a case for preventing the swaying of float.

It is also an object of the present invention to provide a liquid level meter which assures high linearity of displacement of float and indicated value of indicator and an excellent indication accuracy.

It is also an object of the present invention to provide a liquid level meter which assures a high linearity of output voltage for inductance.

It is additional object of the present invention to provide a liquid level meter having simple constitution and assuring high reliability because an oscillation circuit is required only to generate a rectangular wave but the accurate sine wave.

It is also additional object of the present invention to provide a liquid level meter which holds the indication even if the power supply is turned OFF, accordingly increases a chance of checking the remainder of liquid and remarkably lessens the chance of no-liquid condition due to negligence of liquid supply.

In order to attain above objects, the present invention comprises a coil having the core, a float, comprising a conductive ring, which is provided at the external circumference of coil so that it can freely move in the longitudinal direction along the core, a detector which detects change of inductance of coil with movement of said float, namely a conductive ring, a converter which converts change of inductance detected by said detector to change of voltage and an indicator which is driven by a driver based on such conversion and indicates liquid level.

Other objects of the present invention will become apparent and understood from the preferred embodiments thereof and defined in the claims attached. Further features or advantages of the present invention are also understood by those skilled in this art by setting forth the present invention.

BRIEF DESCRIPTION OF THE DRAWINGS

FIG. 2 to FIG. 5 indicate the detector of this embodiment.

FIG. 2 is a cross section of detector as a whole, where

FIG. 4 is a schematic diagram of a magnetic equivalent circuit of the same coil;

FIG. 5 is a perspective view indicating a conductive cylinder around the external circumference of the coil;

FIG. 6 to FIG. 8 refer to the L-V conversion circuits with

FIG. 6 is a schematic diagram thereof;

FIG. 7a to FIG. 7e show the waveforms for explaining operations of the circuit;

FIG. 7a shows changes of voltage $V_f$;

FIG. 7b shows changes of voltage $V_r$;

FIG. 7c shows changes of voltage $V_a$;

FIG. 7d shows changes of voltage $V_{and}$; and

FIG. 7e shows changes of voltage $V_b$;

FIG. 8 shows a characteristic indicating relation between an output voltage of L-V conversion circuit and displacement of float;

FIG. 14 is a perspective view of an arm float type liquid level meter of the prior art;

FIG. 15 is a perspective view of a linear potentiometer type liquid level meter of the prior art;

FIG. 16 is a partly enlarged view of linear potentiometer of the prior art; and

FIG. 17 is a cross section indicating the loading condition of the same linear potentiometer.

DETAILED DESCRIPTION OF THE PREFERRED EMBODIMENTS

A preferred embodiment of the present invention, embodied in a liquid level meter which is provided to a fuel tank of automobiles and indicates a remaining amount of fuel such as gasoline or light oil will then be explained with reference to the drawings.

Figure 1:
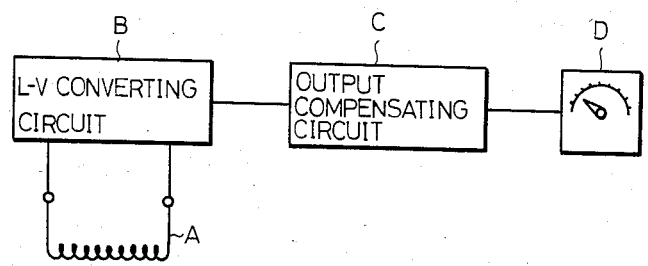
FIG. 1 outlines the entire part of an embodiment of the present invention embodied in a liquid level meter for a fuel tank of automobiles.

First, the constitution as a whole of the embodiment is outlined in accordance with FIG. 1. The embodiment comprises a detector A which is formed by movably providing a float comprising a conductor ring at the external circumference of a coil having a core such as a bar, an inductance-to-voltage (referred to throughout the specification as L-V) conversion circuit B which is connected to the same coil and converts changes of inductance thereof into changes of voltage, an output compensating circuit C for setting output voltages of the L-V conversion circuit B to the characteristic of indicator and a liquid level indicator D. These components A to D are sequentially explained in detail.

Detector A

A detector A is explained with reference to FIG. 2 to FIG. 5. 1 is a fuel tank of an automobile which stores the fuel 2 such as gasoline or light oil. Only the upper plate 3 and bottom plate 4 of tank 1 are indicated. 5 is a detector A loading hole provided to the upper plate 3.

6 is a housing of detector A loaded on the upper plate 3 of tank 1 by means of screws 7, allowing a through hole 8 to be provided at the center thereof. 9 is a recession for accommodation provided at the upper part of housing 6. A cover 10 is attached at the upper surface thereof. 11 is a rubber packing provided between the housing 6 and tank 1.

12 is a coil having a longitudinal length which is provided at the upper end through the through hole 8 and extends downward vertically until the point just above the bottom plate 4. This coil also has a core, winding and a sleeve as explained later. An inductance of coil 12 is represented as L and a DC resistance as r. Core 13 is also bar shaped and is provided by a non-magnetic core holder 13a through the through hole 8 and is extending up to the point just above the bottom plate 4. This core is formed into a diameter of 10 mm and length of 160 mm with a magnetic material having high permeability and insulation characteristic, for example, ferrite.

Figure 3A:
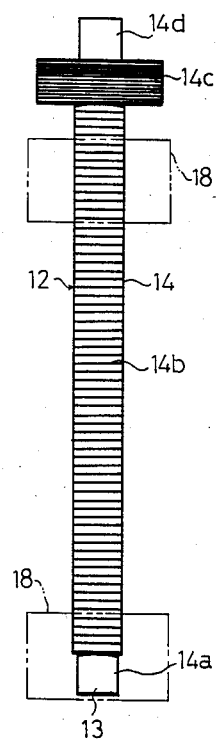
FIG. 3a is a front elevation of the coil.

14 is a winding of coil 12 wound around the core 13 and it is wound by the following method. Namely, as shown in FIG. 3a, particularly, un-wound part 14a is formed in the length of about 10 mm at the lowest end part of core 13, a roughly-wound part 14b which is wound uniformly and in one direction is formed in the range of 10 to 140 mm from the lower end of core 13, a closely wound part 14c formed by multiple windings is formed in the range of 10 to 20 mm in the length from the upper end of core 13, and un-wound part 14d is formed in the length of about 10 mm at the highest part of core 13. 15 is a sleeve made of synthetic resin (non-magnetic material) which is loosely engaged with external circumference of winding 14 and is engaged with the through hole 8, in order to protect the winding 14 and guides the vertical movement of float described next. 16 is a cap made of synthetic resin (non-magnetic material) engaged with the lower end of sleeve 15 which prevents the fuel 2 from entering the sleeve 15.

17 is a float loosely engaged, for vertical movement, with the external circumference of coil 12. This float is formed like a doughnut made of rubber or formed body of synthetic resin (non-magnetic material) and has a specific gravity which is smaller than that of the fuel 2. Accordingly, the float 17 floats on the fuel 2 and moves vertically in accordance with change of liquid level of fuel 2. 18 is a conductor ring attached to the internal circumference of float 17 which is made of a high polymer material having a small specific gravity (near to the gravity of fuel 2) and also has conductivity. The material used can be for example, a synthetic resin filled with carbon. The lower end of this conductor ring 18 is coupled with said cap 16 and is prevented to drop.

19 is a substrate provided in the accommodating recession 9 of housing 6, comprising the L-V conversion circuit B and the output compensating circuit C to be described later.

Figure 5:
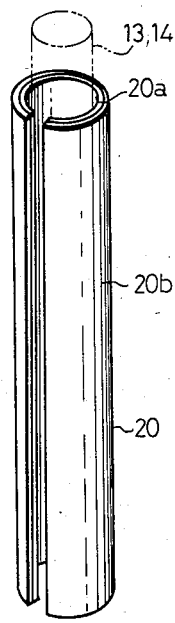

20 is a conductive cylinder provided between the winding 14 and the sleeve 15, where a sheet material consisting of an insulating sheet 20a and a conductive sheet 20b laminated as shown in FIG. 5 is wound cylindrically to the external circumference of the winding 14 so that the insulating sheet 20a is placed at the internal side. Although not shown, the conductive sheet 20b is connected to the ground line of substrate 19. Since the winding ends of conductive sheet 20b are not in contact each other, an eddy current loss is not generated on the conductive cylinder 20. The effect of this conductive cylinder 20 is explained in detail in the paragraph for L-V conversion circuit B.

Figure 4:
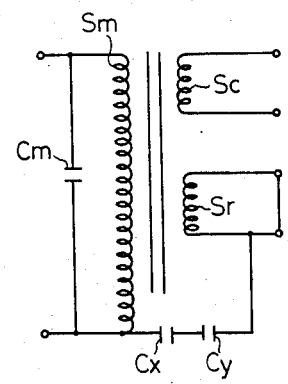

An equivalent circuit of said coil 12 is shown in FIG. 4. Since the core 13 is made of insulating material and simultaneously magnetic material, the winding component $S_C$ of the core 13 itself is released. In addition, since the conductor ring 18 has conductivity, the winding component $S_r$ is short-circuitted. $S_m$ is a winding component of the winding 14, $C_m$ is a stray capacitance of the winding 14, $C_x$ is a static capacitance between the conductive cylinder 20 and the coil 12, and $C_y$ is a static capacitance between the conductive cylinder 20 and the conductor ring 18. $C_x$ and $C_y$ are constant without relation to movement of conductor ring 18.

When a magnetic circuit of said coil 12 is in the open condition, distribution of magnetic flux is generated within the coil 12 and in the vicinity thereof. In case there is a conductor ring 18, since it is made of a conductor material, an eddy current loss is generated by electro-magnetic induction in the same ring 18. Thereby, an inductance viewed from the winding 14 is reduced. Namely, the profile of reduction in inductance L changes in accordance with distribution in the core 13 and in the vicinity thereof. Here, the conductor ring 18 moves on the external circumference of coil 12 in conjunction with the vertical movement of float 17 due to the change of liquid level, but magnetic flux density orthogonally crossing the conductor ring 18 is different in accordance with the position of coil 12 and eddy current loss is also different. Accordingly, inductance L changes with movement of the conductor ring 18.

Since eddy current loss is not generated in the conductive cylinder 20 as explained above, the conductive cylinder 20 does not greatly affect distribution of the leak of maganetic flux.

Here, displacement of the float 17 from the lower end of coil 12 is represented as X and thereby presumed that $X=0$, when the fuel tank 1 storing the fuel 2 becomes almost empty and the float 17 is located at the lowest position (hereinafter, called Emp level), but $X=F$ when the tank is filled with the fuel 2 and the float 17 is located at the highest position (hereinafter called the Full level).

If the winding 14 is formed as the uniform coarse winding part, the coil becomes symmetrical in the upper and lower portions. Since a magnetic flux density orthogonally crossing the conductor ring 18 becomes maximum at the center of coil 12, an inductance L of the coil reaches a minimum when X is approximately equal to F/2. Thereby, the linearity of inductance L for a total displacement of the coil cannot be obtained.

However, the fine winding part 14c is provided continuously at the upper part of coarse winding part 14b in this embodiment in order to generate an asymmetrical distribution of magnetic flux. Therefore the magnetic flux density orthogonally crossing the conductor ring 18 becomes maximum in the vicinity of the upper end of coil 12. Accordingly, the inductance L becomes minimum in the area of conductor ring 18 up to the area near the upper end of the coil 12 and the inductance L is always reduced with upward movement of float 17. Since, unwound portions 14a, 14d are provided, distribution of magnetic flux in the vicinity of the end of coil 12 is adjusted, and increase of inductance L in the vicinity of $X=F$ is restricted.

Figure 3B:
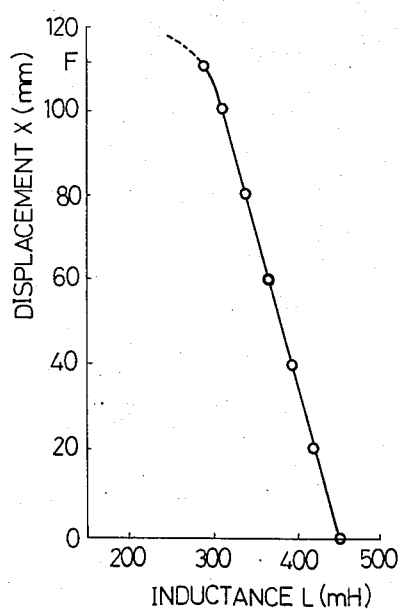
FIG. 3b is an example of characteristic which indicates change of inductance of the same coil for displacement of float.
Figure 2:
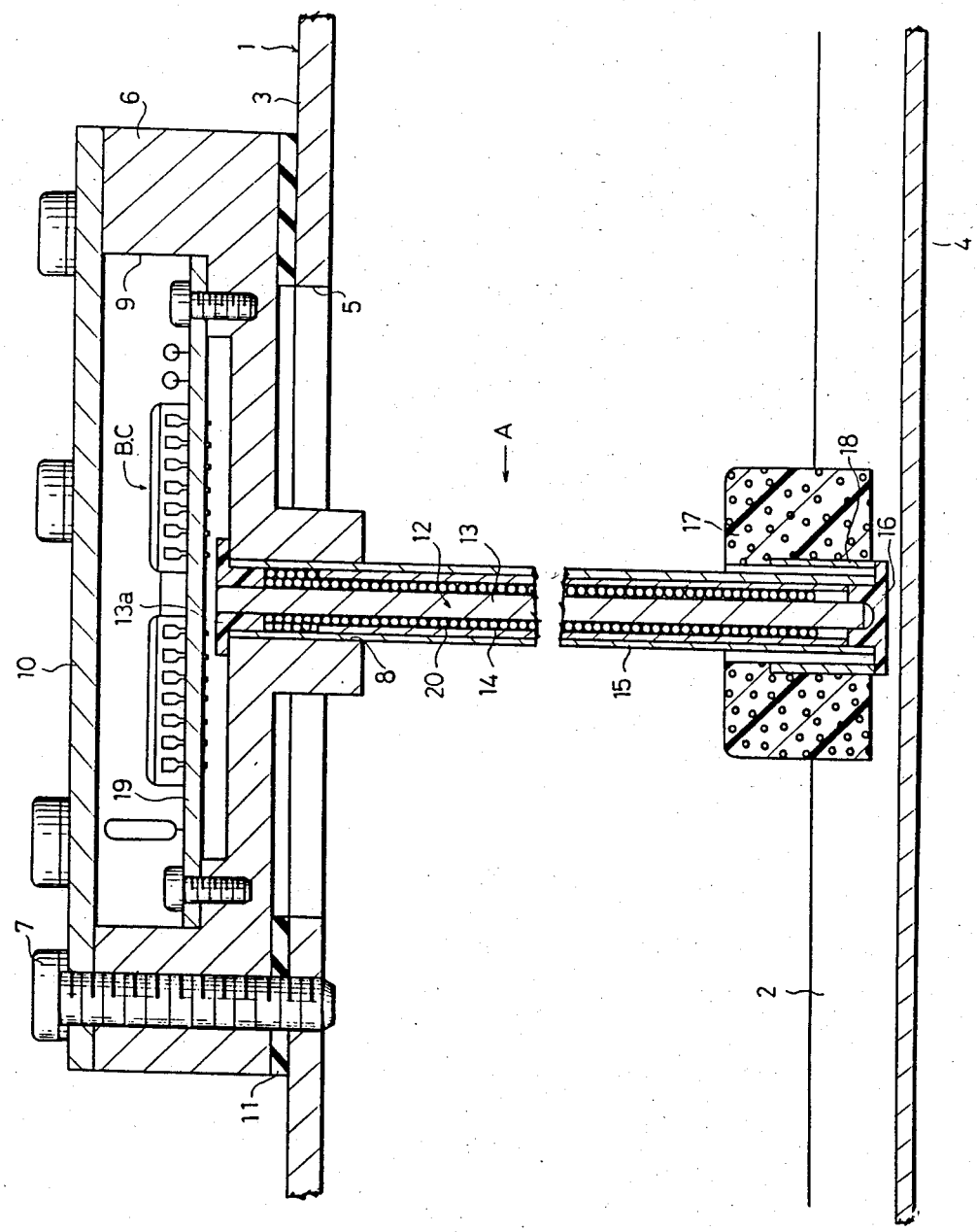

Thereby, the inductance L of coil 12 changes linearly with displacement X of the float 17. A relation between the inductance L and displacement X measured in this embodiment is shown in FIG. 3b. The inductance L changes (reduces) almost linearly from about 450 mH to 300 mH, resulting in excellent linearity.

Since the conductor ring 18 is formed with a material having a small specific gravity (near to the specific gravity of fuel 2), it is light weight and floats with a small buoyancy. Therefore, the float 17 can be formed small in size. Moreover, the coil 12 can be formed in small diameter, taking up little space.

Accordingly, the detector A can be attached easily to the fuel tank 1 and it moves within a small area in the tank 1. Moreover, since the detector A an electrically non-contact type, the float moves smoothly in vertical direction without any influence of friction. Defective operations are less generated, accuracy is little deteriorated and the swaying of the float does not cause a trouble.

Further, since the surface of coil 12 has the smooth surface unlike the linear potentiometer of the prior art, dust in the liquid is deterred from adhering thereto, and defective operation of the float can be reduced remarkably. Moreover, since the float moves linearly at the external circumference of coil, accuracy is less restricted from the rolling of the liquid surface. In addition, the case for preventing the swaying which has been required in the prior art is no longer necessary.

Use of a magnetic material having high permeability and insulation characteristics for the core 13 has released the winding component $S_c$ of the core 13 itself as explained above and caused the inductance L to change only with the conductor ring 18, thereby increasing detection sensitivity.

Figure 6:
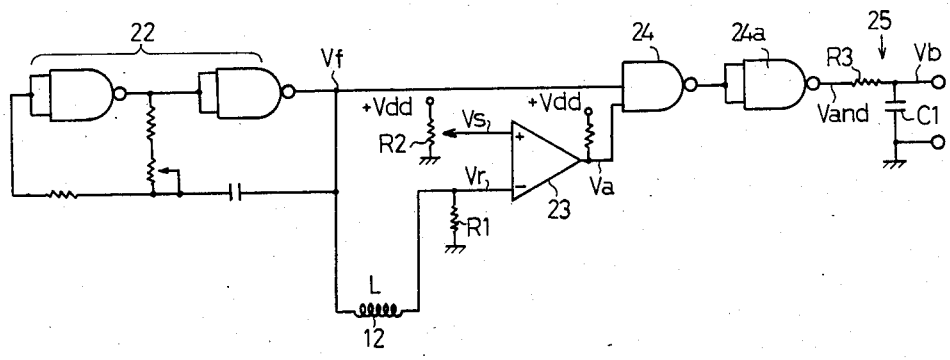

L-V conversion circuit B:

Explained next with reference to FIGS. 6 to 8 is the L-V conversion circuit B which is connected to the detector A and converts the inductance L of coil 12 to change of voltage.

$R_1$ is a resistor connected to the one end of coil 12 having a resistance value R. This resistor $R_1$ forms an LR series circuit with the coil 12 having a time constant of several tens of $\mu$sec. 22 is an oscillation circuit connected to the other end of coil 12 and it generates a rectangular pulse of 10 to 15 kHz. This rectangular pulse is assumed to have a voltage $V_f$, the period of T and the frequency of f. FIG. 7a indicates a rectangular pulse voltage $V_f$, while FIG. 7b indicates a voltage $V_r$ which is generated on a resistor $R_1$ of the LR series circuit. The power supply voltage of this L-V conversion circuit is presumed as $V_{dd}$.

$R_2$ is a variable resistor which generates the reference voltage $V_s$. 23 is a voltage comparator which is connected to the LR series circuit and compares $V_r$ with $V_s$. As shown in FIG. 7c, when $V_r$ is lower than $V_s$, an output voltage $V_a$ is a positive constant voltage. 24 is an AND logic circuit which is connected to the voltage comparison circuit 23 and oscillation circuit 22. This circuit comprises a buffer 24a and when the rectangular pulse voltage $V_f$ and output voltage $V_a$ become positive, an output voltage $V_f$ and becomes equal to the power supply voltage $V_{dd}$. This output period is considered as the phase time $t_r$.

25 is a low-pass-filter connected to the AND logic circuit 24, consisting of a CR circuit comprising a resistor $R_3$ and capacitor $C_1$. The output voltage $V_b$ of such circuit is shown in FIG. 7e.

Advantages of this L-V conversion circuit B is then explained. This circuit B utilizes the transient response for rectangular pulse to be applied to the LR series circuit.

When a high level of rectangular waveform is applied to the LR series circuit, the same LR series circuit is charged and $V_r$ changes as follow.

$$V_r = V_{dd}(1 - e^{-(R/L)t}) \quad (1)$$

When a low level of rectangular waveform is applied, the LR series circuit is discharged and $V_r$ changes as indicated by the following equation.

$$V_r = V_{dd} e^{-(R/L)t} \quad (2)$$

In this $V_r$ waveform, a waveform distortion is eliminated by the effect of conductive cylinder 20 of said detector A.

Namely, if the conductive cylinder 20 were not provided, a resonant circuit can be formed by the stray capacitance between coil 12, the static capacitance beween the coil 12 and conductor ring 18 and the inductance of coil 12. In this case, when the conductor ring 18 is located at a certain position of coil 12, the same coil 12 is divided at this position and thereby the resonance frequency changes with movement of the conductor ring 18. Accordingly, distortion is generated in the $V_r$ waveform by the transient phenomenon as indicted by the dotted line of FIG. 7b.

However, in the detector A of this embodiment, the conductive cylinder 20 is connected to ground and is provided for the coil 12 as explained above. Thereby, the coil 12 is electro-statically shielded from the conductor ring 18. Namely, since the static capacitance $C_x$ between the conductive cylinder 20 and coil 12 and the static capacitance $C_y$ between the conductive cylinder 20 and conductor ring 18 are constant without relation of movement of the conductor ring 18, the transient phenomenon does not occur and said distortion is not generated.

The output voltage $V_{and}$ of the AND logic circuit 24 (FIG. 7d) contains the delay time of LR series circuit, namely the phase time $t_x$ from the rising edge of pulse to the reference voltage $V_s$ for every period.

$t_x$ can be obtained from the equation (1) under the condition of $V_r = V_s$, as indicated below.

$$t_x = -\ln(1 - V_s/V_{dd})L/R \quad (3)$$

Since $V_s$, $V_{dd}$ and R are constant, the phase time $t_x$ is proportional to the inductance L. The output voltage $V_{and}$ of the AND logic circuit 24 is a pulse but its average voltage $V_{and\ mean}$ is indicated by the following equation.

$$V_{and\ mean} = V_{dd} t_x / T \quad (4)$$

From the equations (3, 4), it can be understood that the $V_{and\ mean}$ is proportional to the inductance L. The average value of voltage $V_{and}$ can be obtained by providing said low-pass-filter 25. In this case, the output voltage $V_b$ becomes equal to $V_{and\ mean}$.

Thereby, an output voltage $V_b$ of this L-V conversion circuit B is proportional to the inductance L as indicated below.

$$V_b = -\ln(1 - V_s/V_{dd})V_{dd}L/RT \quad (5)$$

Since the inductance L changes linearly for the displacement of conductor ring 18 as explained above, an output voltage $V_b$ also changes linearly for the displacement X. The relation between the output voltage $V_b$ measured in this embodiment and displacement X is shown in FIG. 8. This is a measured value under the condition, f = 15 kHz, $V_s = 6$ V, $V_{dd} = 8$ V and a high linearity can be obtained with such value.

This L-V conversion circuit B is very effective for the following reason; the coil 12 is provided with various strategic designs and thereby the inductance L thereof can be changed in the comparatively high level as wide as 10 to 1000 mH (300 to 450 mH, in this embodiment as explained previously).

In other words, the shorter period T or longer phase time $t_x$ is better for raising the output voltage $V_b$ but the condition $t_x < T/2$ must be satisfied. Here, the period T must be as long as neglecting delay of response in a general integrated circuit to be used in said AND logic circuit 24, etc. Therefore, the inductance L is required to be increased in order to make longer the phase time $t_x$.

It is enough for the oscillation circuit 22 to generate only the rectangular wave is not required to generate the accurate sine wave. Therefore, constitution is simple and economical with high reliability.

In the $V_r$ waveform of FIG. 7b, a transient ringing is generated at the rising and falling portions of rectangular wave (however, such ringing is as little as giving no adverse effect on said operation). Such ringing is generated because a little stray capacitance generated between windings 14 works as a CR series circuit in case the coil 12 has a large number of turns. Particularly, it is not desirable to employ the method where a time constant during discharge is reduced by connecting a parallel diode to the coil 12, because the ringing becomes large due to a large static capacitance of diode. When a number of turns decreases, such transient phenomenon also becomes small but it must be eliminated ideally.

As a converting means 1 other than said L-V conversion circuit B, it is possible that a coil is built in the oscillation circuit and change of oscillation frequency by this inductance can be detected. In this case, however, many parts are required for constituting the oscillation circuit and respective characteristics must be stabilized. Oppositely speaking, stability of characteristics of respective parts is limited from the point of view of the cost and therefore circuit characteristics are dispersed largely and accuracy is lowered. When this accuracy is increased, additional circuits are required, resulting in cost up and deterioration of reliability. Moreover, a number of parts of f-V conversion circuit which is required for converting the oscillation frequency to voltage increases and it is inferior in the cost and reliability.

Further, as the other converting means 2, detection is also possible from phase difference in the LR series circuit. In this method, the sine wave is used as the oscillation waveform and delay of phase of current in the LR series circuit is detected. However, this method has following disadvantages that good sine wave must be generated, phase must be detected with high accuracy, a circuit for converting a phase difference signal into a voltage proportional to the inductance is required and such circuit executes the tangent calculation.

It is also possible to provide a converting means 3 for detecting a divided voltage by an impedance of the sine wave applied in the same way as explained above. However, this method is also inferior in the number of parts, accuracy and cost, etc.

But, it is possible to employ said converting means 1 to 3 to the liquid level meter of the present invention by overcoming the disadvantages of them.

Output compensating circuit C and indicator D:

Next, an indicator D and an output compensating circuit C for setting an output voltage $V_b$ of the L-V converting circuit B to the characteristic of said indicator D are explained with reference to FIG. 9 to FIG. 13.

Figure 9:
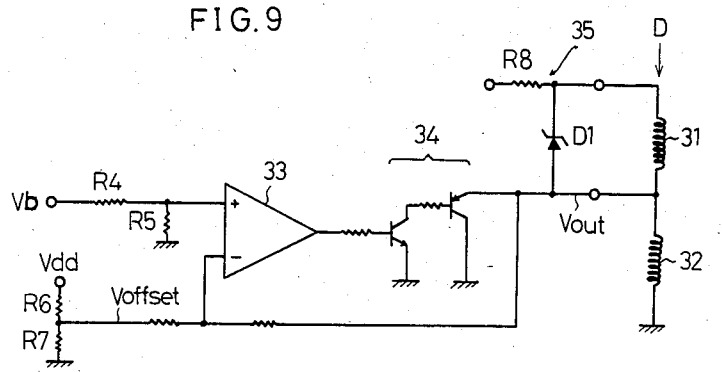
FIG. 9 is an output compensating circuit and a schematic diagram of an indicator.

First, the indicator D shown in FIG. 9 is explained. 31 is a drive electro-magnetic coil which positively deflects the needle of indicator D. 32 is a damping electro-magnetic coil for damping the needle in the opposite direction while controlling it. This coil is connected in series to the drive electromagnetic coil 31.

The indicator D employed in this embodiment is called a hold type. In the indicator of this type, the needle deflects to the position where an electromagnetic force generated on the drive electromagtic coil 31 and an electromagnetic force generated on the damping electromagnetic coil 32 are balanced. Since a winding spring is not used, the indication can be held as it is even after the power switch of automobile is turned OFF. In other words, a driver is capable of having more chance of knowing the remainder of fuel and thereby a careless mistake such as a shortage of fuel during the driving due to negligence of fuel supply can be lowered remarkably. In addition, constitution is simple and economical.

Figure 10:
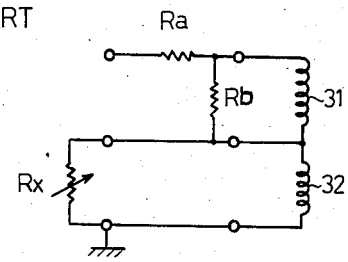
FIG. 10 is a schematic diagram indicating a conventional indicator driving method.
Figure 11:
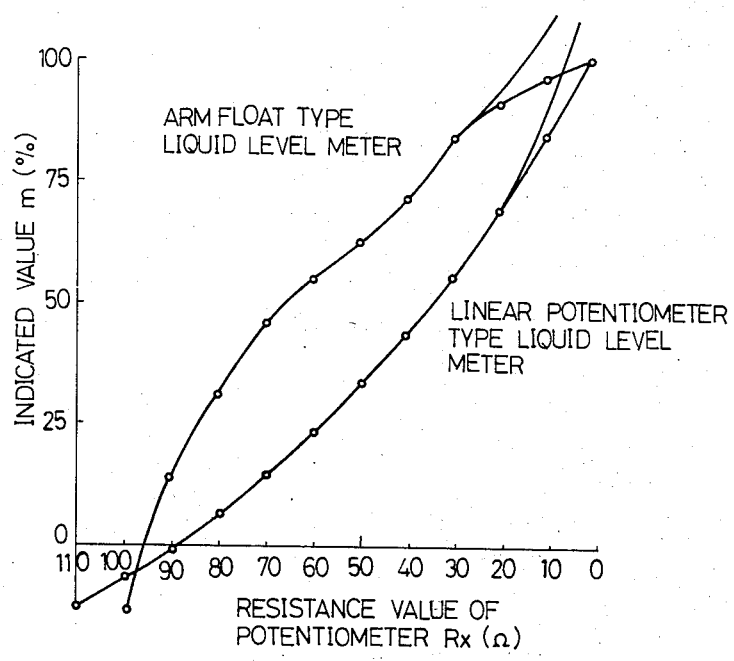
FIG. 11 is a characteristic indicating a relation between indicated values and the potentiometer in the prior art.

A circuit shown in FIG. 10 has been used for driving the indicator D of this type. Namely, the resistors $R_a$, $R_b$ are connected to the drive electromagnetic coil 31 and a rotary potentiometer or linear potentiometer $R_x$ in the prior art explained above is connected to the damping electromagnetic coil 32. However, even if the potentiometer $R_x$ has linearity, relation between the resistance value $R_x$ and indicated value m becomes nonlinear as shown in FIG. 11. It is particularly important in such nonlinear characteristic that the indicator has such essential role as accurately informing a driver of the timing of fuel supply but it has bad linearity in the Emp level.

This embodiment has improved linearity of the detector A as explained above but it is meaningless if the indicator has lowered the linearity. Therefore, it is necessary to check whether the characteristic shown in FIG. 11 is resulting from the circuit configuration in FIG. 10 or it is the intrinsic characteristic of the indicator D itself, or not.

Figure 12:
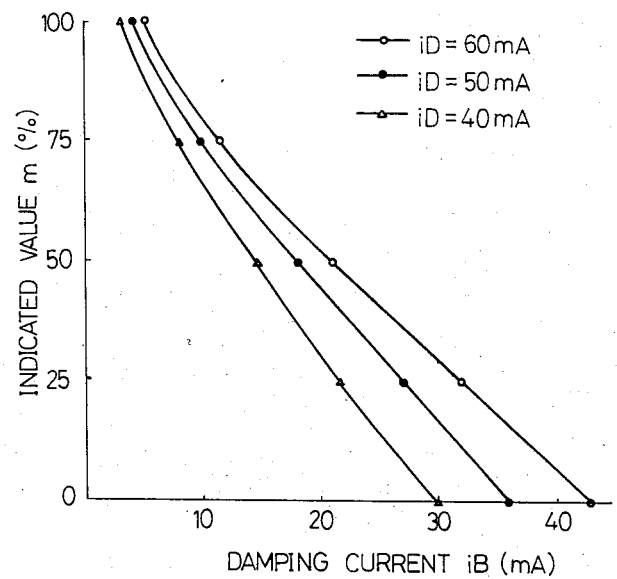
FIG. 12 is a characteristic indicating relation between indicated values and a current flowing into a damping electro-magnetic coil.

Therefore, FIG. 12 shows the result of investigation for linearity of the indicator D itself. The values indicated in FIG. 12 have been measured under the condition that a drive current $i_d$ flowing into the drive electromagnetic coil 31 is kept constant and only the damping current $i_b$ flowing into the damping electromagnetic coil 32 is changed. According to the same figure, when $i_d$ is kept constant, very good linearity can be obtained in the range of indicated value m from 0 to 75%. 0% means the Emp level and therefore it is rather suitable for indication of remainder of fuel at the Emp level in the indicator d itself.

From this fact, it can be forecasted that the characteristic of FIG. 11 is resulting from the circuit constitution, not from the indicator D itself. Namely, since both coils 31 and 32 are connected in series, not only the damping current $i_b$ but also the drive current $i_d$ considered to change in the circuit of the prior art mentioned above due to the change of resistance value of potentiometer $R_x$.

In this embodiment, an output compensating circuit C is provided between the L-V converting circuit B and the indicator D in order to directly use the characteristic of the indicator D shown in FIG. 12.

First, the basic principle of this output compensating circuit C is explained. The drive electromagnetic coil 31 is controlled with a constant current in view of adjusting said L-V conversion characteristic having linearity and the characteristic of indicator D shown in FIG. 12. Namely, the conditions are prepared so that indicated value m=100% is obtained for the displacement X=F and m=0% for the displacement of X=0 and adjustment is carried out so that linearity can be obtained in this range.

Namely, in FIG. 9, 33 is an amplifier which amplifies an output voltage $V_b$ of said L-V converting circuit B and its positive input terminal is provided with the resistors $R_4$ and $R_5$. 34 is a buffer circuit of amplifier 33. Its output is connected to the connecting terminals of both electromagnetic coils 31, 32 and is also fed back to the negative input terminal of amplifier 33. An output voltage of the buffer circuit 34 is represented as $V_{out}$. R6, R7 are resistors for generating an offset voltage $V_{offset}$ and is connected to the negative input terminal of amplifier 33. 35 is a constant current control circuit connected to the drive electromagnetic coil 31 and is composed of a resistor R8 and a zenar diode $D_1$. Namely, a voltage to be applied to the drive electromagnetic coil 31 becomes constant and the drive electromagnetic coil 31 is always driven by a constant current ($i_d$ is constant).

Here, an internal resistance of drive electromagnetic coil 31 is supposed as $r_1$, an internal resistance of dampling electromagnetic coil 32 as $r_2$ and an amplification coefficient of amplifier 33 as K.

The advantages of output compensating circuit C and indicator D are explained hereunder.

For the output compensating circuit C, the following equation can be obtained.

$$V_{out}=K(V_b-V_{offset}) \qquad (6)$$

$$V_{out}=i_b r_2 \qquad (7)$$

When $V_b$ is supposed as $V_{full}$ for the full level and $V_b$ as $V_{emp}$ for the Emp level, $V_b$ can be expressed by the following equation.

$$V_b=-(V_{emp}-V_{full})X/F+V_{emp} \qquad (8)$$

From the equations (6 to 8), $i_b$ can be transformed as indicated below.

$$i_b=K[-(V_{emp}-V_{full})X/F+V_{emp}-V_{offset}]/r_2 \qquad (9)$$

From FIG. 12, m can be expressed by the following equation.

$$m=138.8i_b/i_d+100 \qquad (10)$$

From equations (9, 10), m can be expressed by the following equation.

$$m=138.8KX(V_{emp}-V_{full})/i_d r_2 F+100-138.8K-(V_{emp}-V_{offset})/i_d r_2 \qquad (11)$$

Here, from the conditions that m=100% when X=F and m=0% when X=0, adjustment is necessary so that the following relation can be obtained.

$$V_{full} = V_{offset} \tag{12}$$

$$138.8K(V_{emp} - V_{offset})/i_d r_2 = 100 \tag{13}$$

Here, the amplification coefficient K is determined by determining $i_d$ to a certain value. Namely, next equation is obtained and an indicated value m is proportional to the displacement X.

$$m = 100X/F \tag{14}$$

Figure 13:
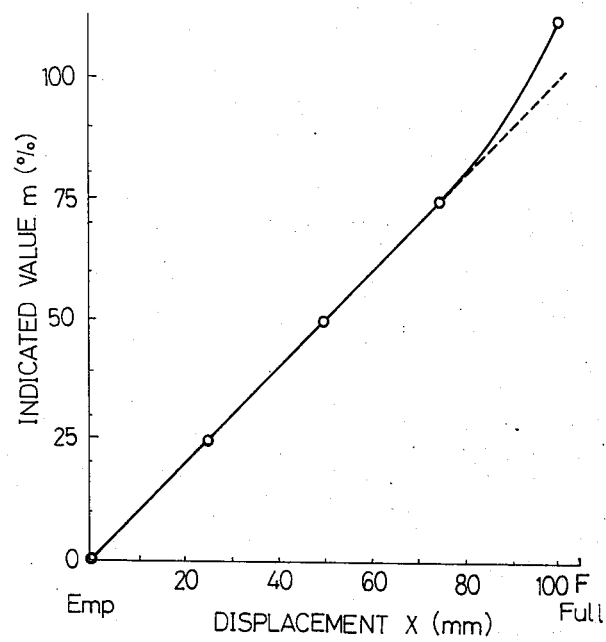
FIG. 13 is a characteristic indicating relation between indicated values and displacement of float.

Relation between the indicated value m and displacement X measured in this embodiment is shown in FIG. 13. These values are measured at $i_d = 50$ mA and assure high linearity with high indication accuracy.

In said embodiment, following modifications are possible.

(1) Material of core 13 is not limited only to said ferrite and any kind of material, if it is a magnetic material having high permeability and insulation characteristic can be used. It is also possible to form a core 13 by manufacturing the structure which does not generate eddy curent easily using a metal magnetic material having a high permeability.

(2) In addition to the method of forming a coil 12 of the embodiment, such method can be changed freely for example, winding density is gradually increased from the lower end of core 13 or distribution of the coarse winding part 14b and fine winding part 14c are changed.

(3) As the material of conductor ring 18, those, if it is a high polymer material having a small specific gravity and conductivity such as carbon fiber reinforced plastic (CFRP) conductive polyvinylchloride (PVC), conductive rubber, conductive foamed rubber, etc. can be used. If these materials do not have sufficient corrosion proof characteristics for the liquid, a protection material must be provided to the internal circumference of conductor ring 18.

Although, the weight increases a little, the conductor ring 18 can certainly be formed with aluminum or copper or other metal and it can also be formed integrally to the internal circumference of float 17.

(4) The output compensating circuit C drives the drive electromagnetic coil 31 with a constant current. Therefore, other circuit, if it is capable of matching the characteristic of said indicator D and the characteristic of the L-V converting circuit B, can also be used. If a high accuracy is not required, the output compensating circuit C may be omitted or can also be simplified so long as it drives the drive electromagnetic coil 31 with a constant current.

(5) Other type of indicator D can be used. Particularly, the output compensating circuit C can be omitted by independently providing the drive coil 31 and damping coil 32 through disconnection of wirings of them.

(6) This embodiment can be embodied as a liquid level meter for various kinds of containers such as oil tank, water storage tank, petroleum tank, electrolyte tank, etc., as well as the liquid level meter of fuel tank in automobiles.

(7) In the L-V converting circuit B, a frequency f of the oscillation circuit 22, a time constant of the LR series circuit can be changed.

(8) An insulation sheet 20a of conductive cylinder 20 may be omitted or the conductive cylinder 20 can be formed with a conductive synthetic resin. Moreover, the conductive cylinder 20 itself can be omitted in accordance with the frequency f of oscillation circuit 22 and material of core 13 and it is also possible to omit to set the conductive cylinder 20 to the ground level.

As explained above in detail, the present invention brings about following excellent advantages;

1. since the detector is non-contact type electrically, the float moves smoothly in vertical, without defective operation and decrease of accuracy and the swaying of float does not result in trouble, 2. since dust in the liquid is not easily adhered to the detector, defective operation of the float is remarkably reduced, 3. linear movement of the float at the external circumference of coil does not lower the accuracy for the rolling of liquid surface, 4. a case for preventing the sway which has been required for the prior art is not longer necessary, and 5. linearity of displacement of the float and indicated value of indicator is high and excellent accuracy can be obtained.

Since it is apparent that a variety of embodiments can be constituted without departure from the spirit and scope of the present invention, the present invention is not restricted by the particular embodiments, except for those defined in the attached claims.

What is claimed is:

1. A liquid level meter comprising:
   (a) a core, and a coil wrapped therearound, the coil having an external circumference and extending in a longitudinal direction,
   (b) a float which is provided at the external circumference of the coil so that it can move in the longitudinal direction thereof along the core and which has a conductor ring located around an inner circumference thereof so that the conductor ring is adjacent to different longitudinal areas of the coil depending on the fluid level,
   (c) detector means for detecting a change of inductance of the coil caused by eddy current loss within the coil when the conductor ring is adjacent to different longitudinal areas of the coil,
   (d) converting means for converting the change of inductance detected by the detector means into a change of voltage, and
   (e) an indicator of liquid level which is driven by a drive circuit based on a voltage of the converting means.

2. A liquid level meter comprising:
   (a) a core, and coil wrapped therearound, the coil having an external circumference and extending in a longitudinal direction,
   (b) a float which is provided at the external circumference of the coil so that it can move in the longitudinal direction thereof along the core,
   (c) a conductor ring, coupled to the float,
   (d) detector means for detecting a change of inductance of the coil in accordance with movement of the float,
   (e) inductance-to-voltage converting means for converting a change of inductance detected by the detector means into a conversion voltage, and
   (f) an indicator of liquid level which is driven by a drive circuit based on the conversion voltage wherein said inductance to voltage converting means includes a resistor which is connected to the coil and forms an LR series circuit therewith, an oscillation circuit which applies a rectangular wave pulse to this LR series circuit, a voltage comparison circuit, an AND logic circuit which extracts a transient response time of the LR series circuit, and a low-pass-filter which is connected to the logic circuit and outputs a voltage proportional to the inductance of the coil.

3. A liquid level meter comprising:
   (a) a core, and coil wrapped therearound, the coil having an external circumference and extending in a longitudinal direction,
   (b) a float which is provided at the external circumference of the coil so that it can move in the longitudinal direction thereof along the same core and which includes a conductor ring coupled thereto,
   (c) detector means for detecting a change of inductance of the coil in accordance with movement of the float,
   (d) inductance-to-voltage converting means for converting a change of inductance detected by the detector means into a conversion voltage, and
   (e) an indicator of liquid level which is driven by a drive circuit based on the conversion voltage further comprising: an output compensating means provided between L-V converting circuit and the indicator for matching an output voltage of the inductance-to-voltage converting circuit to the characteristic of the indicator.

4. A liquid level meter according to claim 3, further comprising a drive circuit for the indicator including:
   a drive electromagnetic coil which positively deflects a needle, and
   a damping electromagnetic coil which is connected in series to the drive electromagnetic coil and damps the needle in the opposite direction while controlling it,
   wherein the output compensating means deflects the needle by driving the drive electromagnetic coil with a constant current obtained from the constant current control circuit.

5. A liquid level meter according to claim 4, wherein the constant current control circuit is connected to the drive electromagnetic coil and includes a resistor and zener diode.

6. A liquid level meter according to claim 1, wherein the converting means is an inductance-to-voltage converting circuit.

7. A liquid level meter according to claim 1, wherein the conductor ring is formed by a high polymer material having small specific gravity and conductivity.

8. A liquid level meter according to claim 1, wherein the material of the core is chosen to be a magnetic material having a high permeability and high insulation characteristic.

9. A liquid level meter comprising:
   (a) a core, and a coil wrapped therearound, the coil having an external circumference extending in a longitudinal direction,
   (b) a float which is provided at the external circumference of the coil so that it can move in the longitudinal direction thereof along the same core and which includes a conductor ring coupled to the float,
   (c) detector means for detecting a change of inductance of the coil in accordance with movement of the float,
   (d) inductance-to-voltage converting means for converting a change of inductance detected by the detector means into a conversion voltage wherein a winding of the coil has a winding density which causes the magnetic flux density orthogonally crossing the conductor ring to become a maximum at an area near the upper end part of the coil.

10. A liquid level meter according to claim 9, wherein the winding has a pair of unwound portions at the upper and lower ends of the core, a coarse winding part formed between the unwound portions and a fine winding part formed between the coarse winding part and the upper unwound portion.

11. A liquid level meter according to claim 1, further comprising conductive cylinder means, provided at the external circumference of a winding of the coil, for covering the winding and for preventing the winding ends thereof from coming in contact with each other.

12. A liquid level meter according to claim 11, wherein a conductive cylinder is coupled to a ground potential.

13. A liquid level meter according to claim 11, further comprising an insulation sheet wound cylindrically at an external circumference of the winding and a conductive sheet attached at the external circumference of the insulation sheet, the insulation sheet and conductive sheet forming a conductive cylinder.

14. A liquid level meter according to claim 13, wherein the conductive sheet is coupled to the ground potential.

15. A liquid level meter according to claim 11, wherein a sleeve is provided at the external circumference of the conductive cylinder to protect the winding and guide movement of the float.

16. A liquid level meter according to claim 1, wherein the conductor ring is made of a metal material and attached to the internal circumference of the float.

17. A liquid level meter according to claim 1, wherein the core is formed with metal magnetic material having a high permeability in such a structure that eddy current loss is not easily generated thereon.

* * * * *